US010222925B2

(12) United States Patent
Han et al.

(10) Patent No.: US 10,222,925 B2
(45) Date of Patent: Mar. 5, 2019

(54) TOUCH SENSOR SHEET, TOUCH DISPLAY PANEL, AND DISPLAY APPARATUS

(71) Applicant: SAMSUNG ELECTRONICS CO., LTD., Suwon-si (KR)

(72) Inventors: Young-ran Han, Suwon-si (KR); Kyoung-oh Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 14/810,743

(22) Filed: Jul. 28, 2015

(65) Prior Publication Data

US 2016/0048247 A1 Feb. 18, 2016

(30) Foreign Application Priority Data

Aug. 18, 2014 (KR) ................. 10-2014-0107012

(51) Int. Cl.
| G09G 5/00 | (2006.01) |
| G06F 3/047 | (2006.01) |
| G02F 1/1333 | (2006.01) |
| G02F 1/1335 | (2006.01) |
| G06F 3/046 | (2006.01) |

(52) U.S. Cl.
CPC .......... *G06F 3/047* (2013.01); *G02F 1/13338* (2013.01); *G02F 1/133603* (2013.01); *G06F 3/046* (2013.01)

(58) Field of Classification Search
CPC ...... G06F 3/044; G06F 3/0412; G06F 3/0416; G06F 3/04187
See application file for complete search history.

(56) References Cited

U.S. PATENT DOCUMENTS

| 7,755,616 | B2 | 7/2010 | Jung et al. | |
| 8,264,624 | B2 | 9/2012 | Kaji et al. | |
| 2008/0122803 | A1* | 5/2008 | Izadi | G06F 3/0421 |
| | | | | 345/175 |
| 2009/0021492 | A1* | 1/2009 | Wu | G06F 3/03547 |
| | | | | 345/175 |
| 2010/0171891 | A1* | 7/2010 | Kaji | A63F 13/06 |
| | | | | 349/12 |
| 2010/0183200 | A1* | 7/2010 | Wu | G06K 9/00046 |
| | | | | 382/127 |
| 2010/0224758 | A1* | 9/2010 | Kuo | G06F 3/03545 |
| | | | | 250/203.1 |
| 2011/0186952 | A1* | 8/2011 | Toda | H01L 51/00 |
| | | | | 257/432 |
| 2012/0140143 | A1* | 6/2012 | Wurzel | G02F 1/1333 |
| | | | | 349/62 |
| 2012/0280936 | A1* | 11/2012 | Wang | G06F 3/044 |
| | | | | 345/174 |

(Continued)

FOREIGN PATENT DOCUMENTS

| CN | 201910782 | * | 7/2011 | ............. H03K 17/96 |
| JP | 2004-302431 A | | 10/2004 | |
| WO | 2008/143212 A1 | | 11/2008 | |

*Primary Examiner* — Olga V Merkoulova
(74) *Attorney, Agent, or Firm* — Sughrue Mion, PLLC

(57) ABSTRACT

A touch display panel including: a backlight unit including a plurality of light-emitting devices; and a touch sensor sheet disposed on the backlight unit, comprising at least one hole corresponding to at least one of the plurality of light-emitting devices and a touch sensor configured to sense a user touch on the touch display panel.

20 Claims, 10 Drawing Sheets

(56) References Cited

U.S. PATENT DOCUMENTS

2013/0120760 A1* 5/2013 Raguin .................. G01B 11/24
356/612
2015/0212254 A1* 7/2015 Sun ...................... G02B 6/0055
362/606
2016/0048247 A1* 2/2016 Han .................... G02F 1/13338
345/174

* cited by examiner (a)

(b)

TOUCH SENSOR SHEET, TOUCH DISPLAY PANEL, AND DISPLAY APPARATUS

CROSS-REFERENCE TO RELATED APPLICATION

This application claims priority from Korean Patent Application No. 10-2014-0107012, filed on Aug. 18, 2014, in the Korean Intellectual Property Office, the disclosure of which is incorporated herein by reference in its entirety.

BACKGROUND

1. Field

Apparatuses and methods consistent with one or more exemplary embodiments relate to a touch sensor sheet, a touch display panel and a display apparatus, and more particularly, to a touch display panel having a direct type backlight structure and a display apparatus having the same.

2. Description of the Related Art

With the development of electronic technology, various types of display panels, such as a liquid crystal display (LCD) panel, a plasma display panel (PDP), and an organic light-emitting diode (OLED) panel, and various types of display apparatuses including the display panels have been developed.

Since LCD panels do not autonomously emit light, LCD panels have a structure in which a backlight unit, such as a cold cathode fluorescent lamp (CCFL) or a light-emitting diode (LED), is disposed behind a LCD cell and a screen is viewed through control of a transmittance amount and color of light emitted from the backlight. The LCD panels are divided into an edge type and a direct type according to a position of the backlight unit.

LCD panels have been applied to various electronic apparatuses including various touch sensors. LCD panels employing a touch sensor of an electromagnetic induction (EMI) type among various touch types have been developed and spread.

EMI touch sensors are generally applied to edge type display panels which may prevent degradation in image quality by placing the EMI touch sensor just below a reflection plate, and may avoid noise caused by a backlight unit peripheral circuit.

Since the backlight unit in the direct type LCD panel is positioned in rear of the LCD cell in a size similar to the LCD cell, it is difficult to avoid electromagnetic noise caused by portions of the backlight unit, such as peripheral circuits. Therefore, in the related art, the EMI touch sensor is applied only to the edge type LCD panel.

Accordingly, there is a need for a technology for applying the EMI touch sensor to LCD panels having a direct type backlight unit structure.

SUMMARY

One or more exemplary embodiments may overcome the above disadvantages and other disadvantages not described above. However, one or more exemplary embodiment are not required to overcome the disadvantages described above, and may not overcome any of the problems described above.

An aspect of one or more exemplary embodiments is to provide a touch display panel having a direct type backlight structure to which an EMI touch sensor is applied and a display apparatus containing the same.

According to an aspect of an exemplary embodiment, there is provided a touch display panel. The touch display panel may include: a backlight unit including a plurality of light-emitting devices; and a touch sensor sheet disposed on the backlight unit, including at least one hole corresponding to at least one of the plurality of light-emitting devices and a touch sensor configured to sense a user touch on the touch display panel.

The touch display panel may further include an optical sheet configured to transfer light emitted from the plurality of light-emitting devices, and the touch sensor sheet may be disposed between the optical sheet and the backlight unit.

A position and size of the at least one hole may correspond to a position and size of the at least one of the plurality of light-emitting devices.

The touch sensor may have a predefined pattern in a region of the touch sensor sheet excluding the at least one hole.

The touch sensor sheet may include: at least one first touch sensor sheet having a touch sensor pattern of a first direction configured to sense an X-axis coordinate of the user touch; and at least one second touch sensor sheet having a touch sensor pattern of a second direction crossing the first direction configured to sense a Y-axis coordinate of the user touch.

The predefined pattern may be a pattern surrounding the at least one hole.

The backlight unit may be a direct type backlight unit.

A color of the touch sensor sheet may be white.

According to an aspect of an exemplary embodiment, there is provided a display apparatus. The display apparatus may include: a touch display panel; and a driver configured to drive the touch display panel. The touch display panel may include: a backlight unit including a plurality of light-emitting devices; and a touch sensor sheet disposed on the backlight unit, and including at least one hole corresponding to at least one of the plurality of light-emitting devices and a touch sensor configured to sense a user touch on the touch display panel.

The touch display panel may further include an optical sheet configured to transfer light emitted from the plurality of light-emitting devices, and the touch sensor sheet may be disposed between the optical sheet and the backlight unit.

A position and size of the at least one hole may correspond to a position and size of the at least one of the plurality of light-emitting devices.

The touch sensor may have a predefined pattern in a region of the touch sensor sheet excluding the at least one hole.

The touch sensor sheet may include: at least one first touch sensor sheet having a touch sensor pattern of a first direction configured to sense an X-axis coordinate of the user touch; and at least one second touch sensor sheet having a touch sensor pattern of a second direction crossing the first direction configured to sense a Y-axis coordinate of the user touch.

The predefined pattern may include a pattern surrounding the at least one hole.

The backlight unit may be a direct type backlight unit.

A color of the touch sensor sheet may be white.

According to an aspect of an exemplary embodiment, there is provided a touch sensor sheet including: a first substrate having at least one first hole formed therein; and at least one first touch sensor disposed on a region of the first substrate excluding the at least one first hole.

The at least one first hole may be configured to correspond to respective at least one light-emitting devices of a backlight unit.

The at least one touch first sensor may include at least one respective elongated sensing coil.

A portion of the at least one elongated sensing coil surrounding the at least one first hole may have a greater thickness than a portion of the at least one elongated sensing coil not surrounding the at least one first hole.

The touch sensor sheet may further include: a second substrate having at least one second hole, a size and position of the at least one second hole corresponding to a size and position of the at least one first hole; and at least one second touch sensor disposed on a region of the second substrate excluding the at least one second hole.

A pattern of the at least on first touch sensor formed on the first substrate may differ from a pattern of the at least one second touch sensor formed on the second substrate.

The first substrate and the second substrate may be laminated together.

According to various exemplary embodiments, an EMI type touch sensor may be applied to a display panel having a direct type backlight structure without reduction in touch sensitivity or degradation in image quality.

Additional aspects and advantages of one or more exemplary embodiments will be set forth in the detailed description, will be obvious from the detailed description, or may be learned by practicing one or more exemplary embodiments.

BRIEF DESCRIPTION OF THE DRAWING FIGURES

The above and/or other aspects will be more apparent by describing in detail certain exemplary embodiments, with reference to the accompanying drawings, in which.

DETAILED DESCRIPTION OF THE EXEMPLARY EMBODIMENTS

Figure 1:
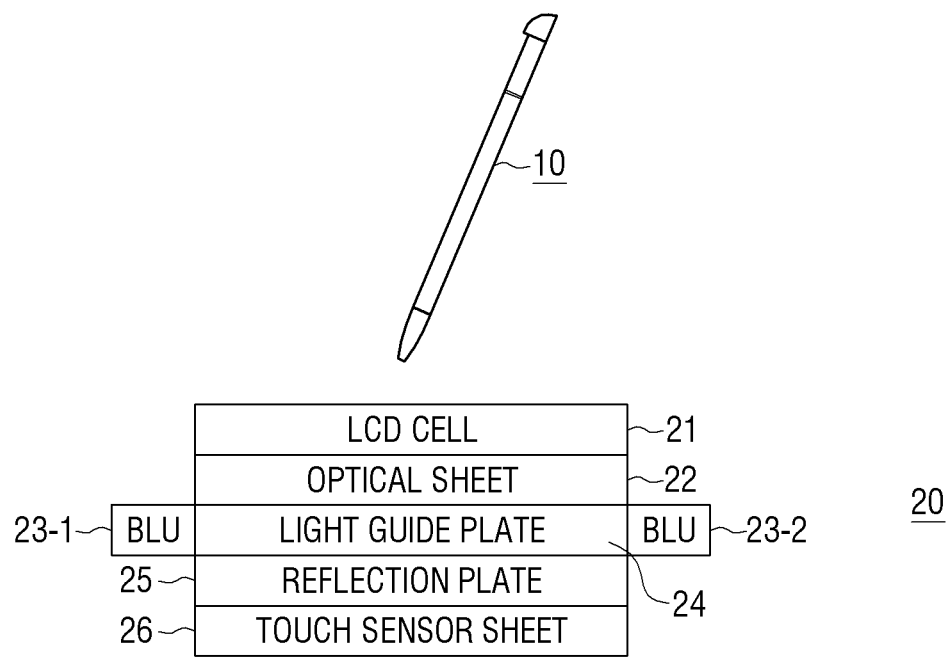
FIG. 1 is diagram illustrating a configuration of a touch display panel including an edge type backlight unit in the related art.

Hereinafter, certain exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of one or more exemplary embodiments. Thus, it is apparent that one or more exemplary embodiments can be carried out without those specifically defined matters. Also, functions or elements known in the related art are not described in detail since they would obscure the descriptions of certain exemplary embodiments with unnecessary detail.

FIG. 1 is a diagram illustrating a configuration of a touch display panel including an edge type backlight unit in the related art. Referring to FIG. 1, an edge type touch display panel 20 may include an LCD cell 21, an optical sheet 22, backlight units (BLUs) 23-1 and 23-2, i.e., backlights, a light guide plate 24, a reflection plate 25, and a touch sensor sheet 26.

As illustrated in FIG. 1, in the edge type touch display panel 20, the BLUs 23-1 and 23-2 are disposed on either side of the LCD cell 21 towards a rear side of the LCD cell 21. Light emitted from the BLUs 23-1 and 23-2 is transferred to the LCD cell 21 through the light guide plate 24 and the optical sheet 22. Since the touch sensor sheet 26 including an electromagnetic induction (EMI) type touch sensor is generally formed of an opaque material, the touch sensor sheet 26 is disposed behind a rear of the reflection plate 25 so as to prevent degradation in image quality, and senses a touch operation of an electronic pen 10 on the LCD cell 21.

Figure 2:
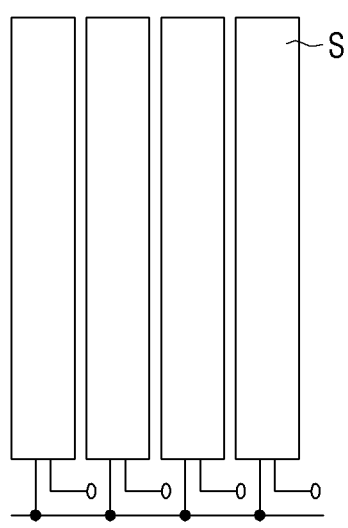
FIG. 2 is a view for explaining an EMI touch method.
Figure 2:
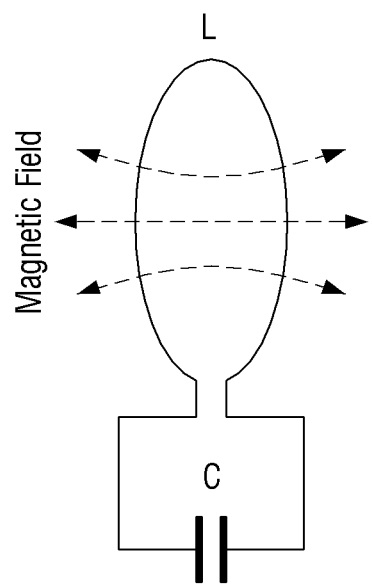

FIG. 2 is a view for explaining an EMI type touch sensing method. In general, an EMI type touch sensor sheet includes a plurality of sensing coils elongated to one direction as illustrated in (a) of FIG. 2. In response to an electronic pen having a configuration as illustrated in (b) of FIG. 2 being moved close to the touch sensor sheet by the user, alternating magnetic flux from the electronic pen flows in the sensing coils of the touch sensor sheet, and voltages are induced in the sensing coils. The largest magnetic flux flows in a sensing coil closest to the electronic pen among the plurality of sensing coils, and, thus, the highest voltage is induced in the sensing coil closest to the electronic pen. Therefore, the sensing coil having the highest induction voltage among the induction voltages of the sensing coils is distinguished, and a coordinate in a one-axis direction on which the electronic pen is touched may be seen.

In an example of FIG. 1, the touch sensor sheet 26 may have a configuration in which two substrates are vertically arranged and the sensing coils as illustrated in (a) of FIG. 2 are built in. The electronic pen 10 may have the configuration as illustrated in (b) of FIG. 2 represented by a capacitance C and an inductance L. When the electronic pen 10 touches an arbitrary point of the LCD cell 21 in the touch display panel 20, the voltages are induced in the sensing coils included in the touch sensor sheet 26, and the position touched by the electronic pen 10 may be determined by measuring the induced voltages.

Referring to FIG. 1, since the BLUs 23-1 and 23-2 and a driver circuit thereof are not located between the electronic pen 10 and the touch sensor sheet 26 in the structure of the edge type touch display panel 20, noise due to the BLUs 23-1 and 23-2 and peripheral circuits thereof may be avoided in the touch operation using the electronic pen 10.

As described above, degradation in image quality and noise due to the BLUs may be avoided when using the EMI touch method in the edge type touch display panel 20. However, in the related art, it is difficult to apply the EMI touch method to a direct type touch display panel.

Figure 3:
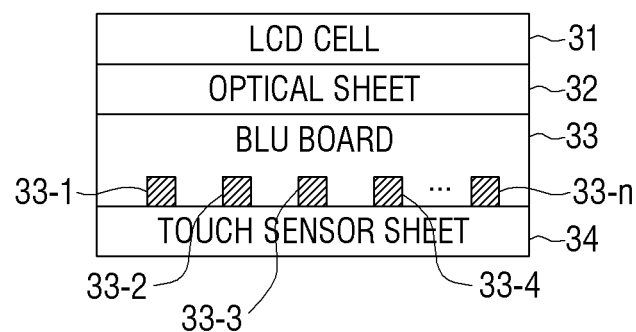
FIG. 3 is a diagram illustrating problems with the related art display panel including a direct type backlight unit using an EMI touch method.

FIG. 3 is a diagram illustrating an EMI type touch sensor sheet 34 applied to a direct type touch display panel in the related art. Referring to FIG. 3, a direct type touch display panel 30 may include an LCD cell 31, an optical sheet 32, and a BLU board 33. It can be seen that the BLU board 33 includes a plurality of light-emitting devices 33-1 to 33-*n*. A BLU driver circuit, i.e., a BLU driver, is disposed behind the LCD cell 31 in the direct type touch display panel 30.

In the related art, when the touch sensor sheet 34 is disposed behind the BLU board 33, it is difficult for the touch sensor sheet 34 to accurately sense a touch due to various types of noise generated in the BLU board 33 including pulse width modulation (PWM) noise of the BLU driver circuit. That is, since the alternating magnetic flux from the electronic pen 10 is transferred to the touch sensor sheet 34 through the BLU board 33 in the structure illustrated in FIG. 3, it is difficult to ignore electromagnetic activity of the BLU board 33.

When the general touch sensor sheet 34 is disposed in front of the BLU board 33 to avoid the noise generated in the BLU board 33, since, as described above, the EMI type touch sensor sheet 34 is opaque, light generated in the plurality of light-emitting devices 33-1 to 33-*n* is absorbed in the touch sensor sheet 34 or reflected by the touch sensor sheet 34, and thus image quality is degraded.

Accordingly, in the related art, the EMI type touch sensor is commonly applied only to the edge type backlight structure due to the above-described problems.

Hereinafter, various exemplary embodiments in which the EMI type touch sensor may be applied to the display panel having a direct type backlight structure without the above-described problems will be described.

Figure 4:
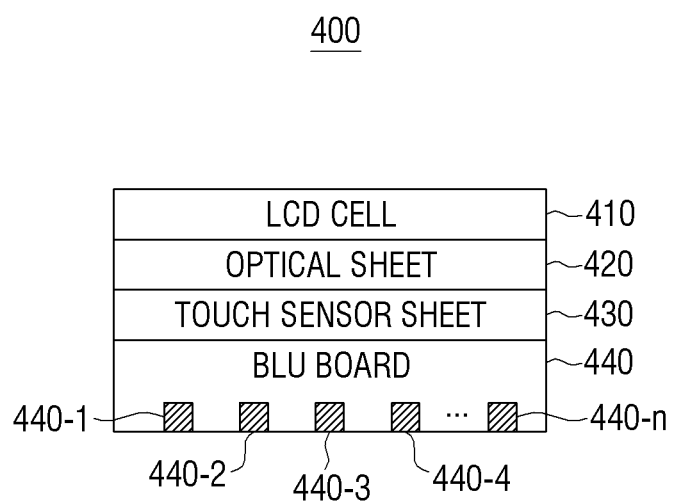
FIG. 4 is a diagram illustrating a touch display panel according to an exemplary embodiment.

FIG. 4 is a diagram illustrating a touch display panel according to an exemplary embodiment. Referring to FIG. 4, a touch display panel 400 may include an LCD cell 410, an optical sheet 420, a touch sensor sheet 430, and a BLU board 440, i.e., a BLU module or a BLU unit.

The BLU board 440 may include a plurality of light-emitting devices 440-1 to 440-*n* and a BLU driver circuit, i.e., a BLU driver. The plurality of light-emitting devices 440-1 to 440-*n* emit light according to a control signal from the BLU driver circuit, and transfer light to the LCD cell 410. The LCD cell 410 controls a transmittance amount of the transferred light and displays a screen. The plurality of light-emitting devices 440-1 to 440-*n* may be CCFLs, LEDs, or OLEDs, but these are merely examples, and the plurality of light-emitting devices 440-1 to 440-*n* are not limited thereto.

The optical sheet 420 is located between the LCD cell 410 and the BLU board 440, and the optical sheet 420 processes light emitted from the BLU board 440 and transfers the processed light to the LCD cell 410. Specifically, the optical sheet 420 may include a diffuser sheet configured to diffuse light emitted from the BLU board 440, a prism sheet configured to increase luminance by refracting and focusing light emitted from the diffuser sheet, a dual brightness enhancement film (DBEF) configured to compensate for light loss through a LCD polarization film, and the like.

The touch sensor sheet 430 senses a touch on the touch display panel. Specifically, the touch sensor sheet 430 includes an EMI type touch sensor. Therefore, the touch sensor sheet 430 may sense a touch of a user using an electric pen on the touch display panel.

The touch sensor sheet 430 according to an exemplary embodiment may be located on the BLU board 440. Specifically, the touch sensor sheet 430 may be located between the optical sheet 420 and the BLU board 440. Further, the touch sensor sheet 430 may include at least one hole corresponding to at least one of the plurality of light-emitting devices 440-1 to 440-*n*. Hereinafter, a configuration of the touch sensor sheet 430 will be described with reference to FIGS. 5A to 5C.

Figure 5A:
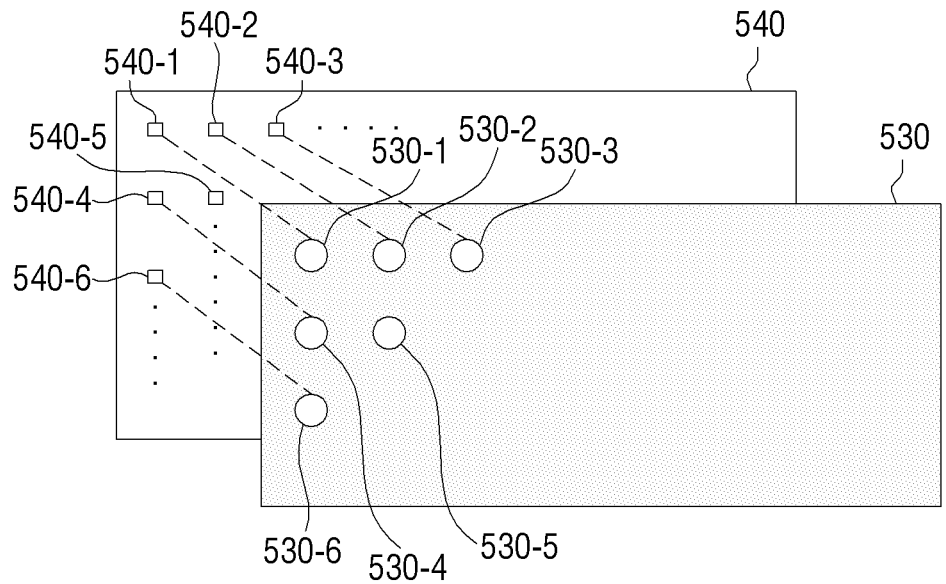
FIGS. 5A to 5C are detailed views illustrating a touch sensor sheet according to one or more exemplary embodiments.
Figure 5B:
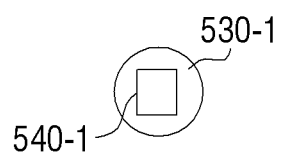
Figure 5C:
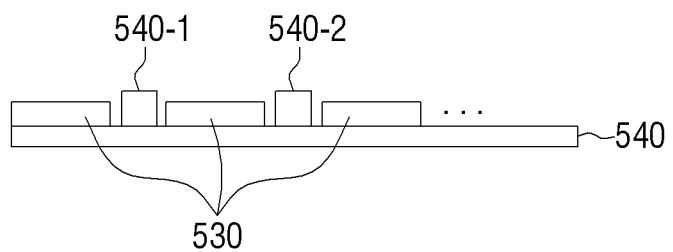

FIGS. 5A to 5C are views illustrating a configuration of a touch sensor sheet according to an exemplary embodiment. Referring to FIG. 5A, a touch sensor sheet 530 is located on a BLU board 540. The BLU board 540 may include a plurality of light-emitting devices 540-1 to 540-6, . . . , and the touch sensor sheet 530 includes a plurality of holes 530-1 to 530-6, . . . corresponding to the plurality of light-emitting device 540-1 to 540-6, . . . , and an EMI type touch sensor.

FIG. 5B is a plan view illustrating one light-emitting device 540-1 and one hole 530-1 corresponding to the one light-emitting device 540-1 when the touch sensor sheet 530 being attached onto the BLU board 540. That is, as illustrated in FIG. 5B, the hole 530-1 may be formed on the touch sensor sheet 530 so that a position and a size of the hole 530-1 correspond to a position and a size of the light-emitting device 540-1.

In the exemplary embodiments illustrated in FIGS. 5A and 5B, the plurality of light-emitting devices 540-1 to 540-6, . . . have a square shape, and the plurality of holes 530-1 to 530-6, . . . in the touch sensor sheet 530 have a circular shape, but this is merely an example. The shapes and sizes of the light-emitting devices 540-1 to 540-6, . . . and the corresponding holes 530-1 to 530-6, . . . may have various similar or different curved or polygonal shapes.

FIG. 5C is a side view of the BLU board 540 and the touch sensor sheet 530 in with the touch sensor sheet 530 attached to the BLU board 540. The plurality of light-emitting devices 540-1,540-2, . . . protrude on the BLU board 540.

Since the touch sensor sheets 430 and 530 according to one or more exemplary embodiments are located on the BLU boards 440 and 540, the touch sensor sheets 430 and 530 may avoid various types of noise generated in the BLU driver circuit. Since the touch sensor sheets 430 and 530 include a plurality of holes corresponding to the plurality of light-emitting devices, even when the touch sensor sheets 430 and 530 being opaque, degradation in image quality due to the opaque touch sensor sheets 430 and 530 may be prevented.

The touch sensor sheets 430 and 530 according to one or more exemplary embodiments may be white. Light emitted from the light-emitting device or light reflected by the optical sheet 420 or the LCD cell 410 and incident to the touch sensor sheet 430 may not be readily absorbed in the touch sensor sheet but reflected by the touch sensor sheet. Therefore, the degradation in image quality may be more effectively prevented.

A touch sensor in the touch sensor sheet included in the touch display panel according to an exemplary embodiment may have a predefined pattern in regions other than regions including the holes. Hereinafter, the pattern of the touch sensor arranged in the touch sensor sheet will be described with reference to FIGS. 6A to 9.

Figure 6A:
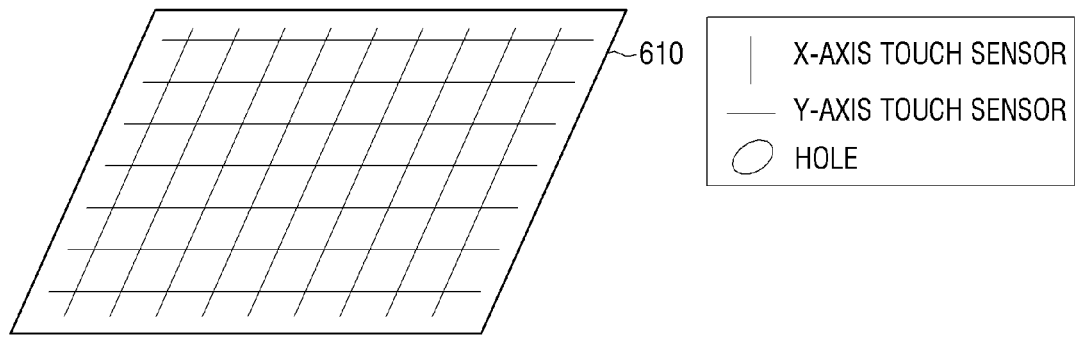
FIGS. 6A to 7 are views illustrating configurations of touch sensors included in touch sensor sheets according to one or more exemplary embodiments.
Figure 6B:
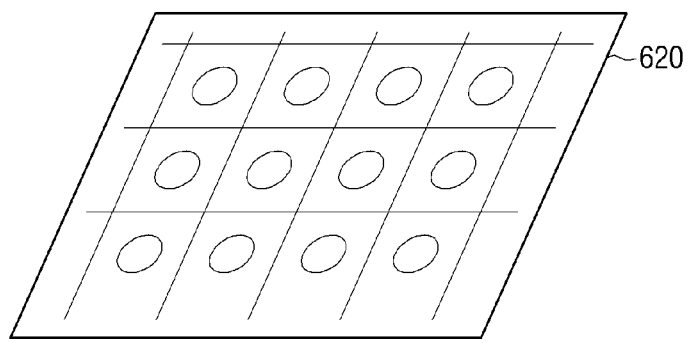
Figure 6C:
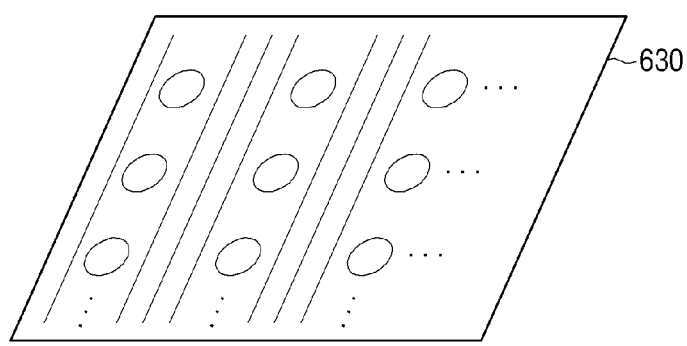
Figure 7:
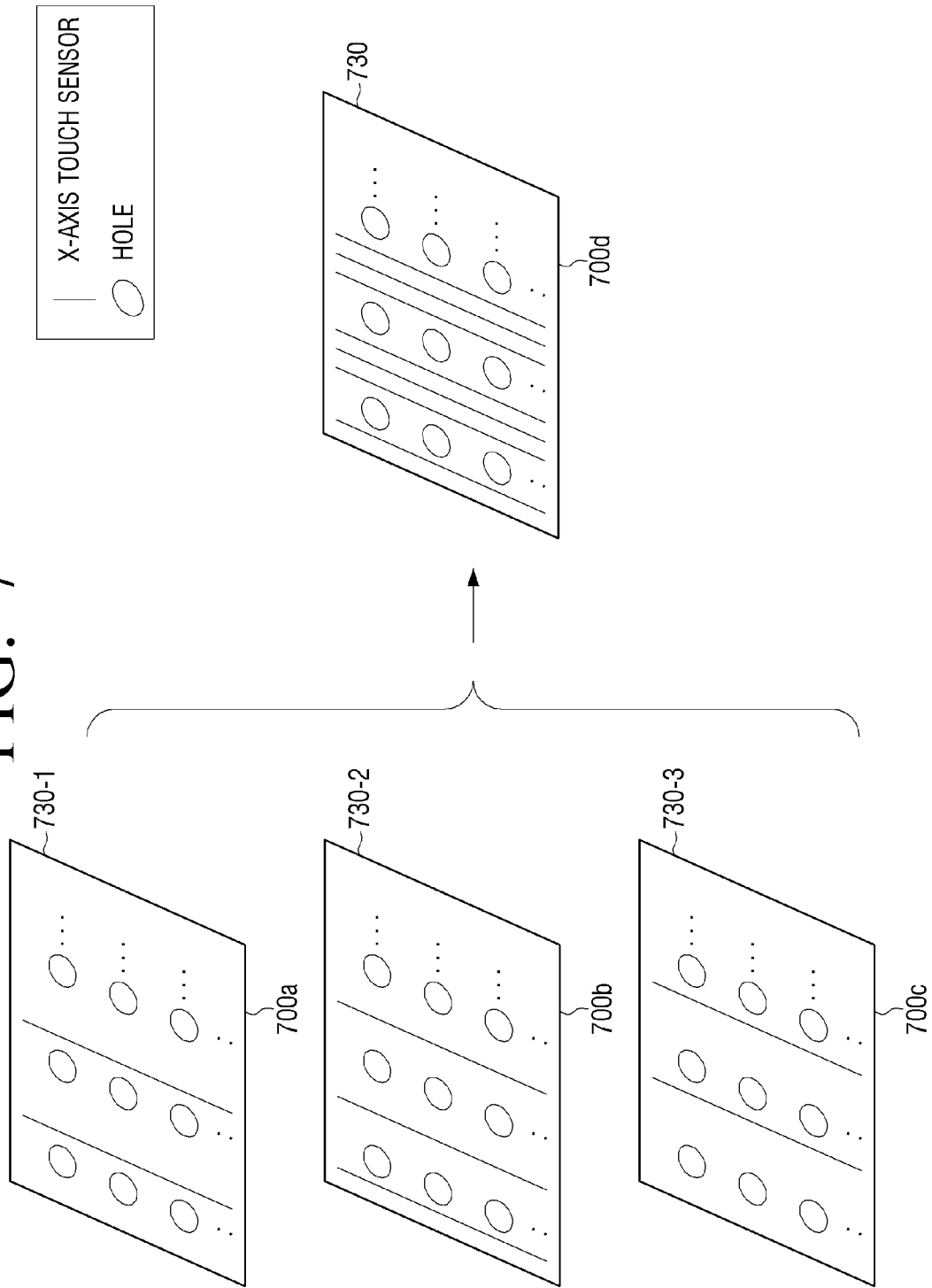

FIGS. 6A to 7 are views illustrating a pattern of a touch sensor included in a touch sensor sheet according to one or more exemplary embodiments. As illustrated in FIG. 6A, in a general EMI type touch sensor sheet 610, a preset number of x-axis touch sensors and a preset number of y-axis touch sensors may be arranged perpendicular to each other, and sense an x-axis coordinate and a y-axis coordinate. The numbers of the x-axis and y-axis touch sensors may be predetermined based on a touch sensitivity or the like desired by a manufacturer of the touch display panel. The x-axis touch sensors and the y-axis touch sensors may be sensing coils. The sensing coils may be elongated. The x-axis touch sensors and the y-axis touch sensors may be disposed on a substrate.

However, since the touch sensor sheet according to an exemplary embodiment includes the plurality of holes corresponding to the plurality of light-emitting devices included in the BLU board, and the touch sensors may not be arranged in the holes, a configuration in which the touch sensors are arranged in a touch sensor sheet 620 in the same form as illustrated in FIG. 6B may be considered. However, when the touch sensors are configured as illustrated in FIG. 6B, the number of touch sensors is reduced as compared with the touch sensor sheet 610 illustrated in FIG. 6A, and, thus, the touch sensitivity is reduced. Further, it is more difficult to detect accurate touch coordinates when the touch sensitivity is reduced.

Therefore, in order to prevent the touch sensitivity from being reduced due to the holes included in the touch sensor sheet, more touch sensors may be arranged in the regions other than a hole region.

It can be seen that the number of x-axis touch sensors arranged between holes in a touch sensor sheet 630 of FIG. 6C is larger than the number of x-axis touch sensors in the touch sensor sheet 620 of FIG. 6B. As the number of touch sensors is increased, the touch sensitivity is increased. Therefore, additional touch sensors may be arranged in a region other than the holes and thus reduction in the touch sensitivity due to the hole region in the touch sensor sheet may be prevented. A y-axis touch sensor may be arranged to cross the x-axis touch sensor, and sense a y-axis coordinate of a user touch in a similar pattern as the x-axis touch sensor.

FIG. 7 is a view illustrating a configuration of a touch sensor sheet included in a touch display panel according to an exemplary embodiment. If an interval between the holes is small, it may be difficult to physically arrange multiple touch sensors on one touch sensor sheet in response to the touch sensor sheet being fabricated.

Therefore, as illustrated in 700d, a touch sensor sheet 730 according to an exemplary embodiment may be fabricated by laminating a plurality of touch sensor sheets having touch sensor patterns such as a touch sensor sheet 730-1 of 700a, a touch sensor sheet 730-2 of 700b, and a touch sensor sheet 730-3 of 700c.

That is, the touch sensor sheet 730 according to an exemplary embodiment may include at least one first touch sensor sheet 730-1 to 730-3 having a touch sensor pattern of a first direction configured to sense an x-axis coordinate of a user touch and at least one second touch sensor sheet having a touch sensor pattern of a second direction crossing the first direction configured to sense a y-axis coordinate of the user touch.

Since one touch sensor sheet is fabricated by combining the plurality of touch sensor sheets, it is possible to fabricate a touch sensor sheet which may prevent touch sensitivity from being reduced due in the hole region even when the distance between the holes is small.

The exemplary embodiments of FIGS. 6A to 7 illustrate the touch sensor sheet having a linear pattern, but this is merely an example.

Figure 8A:
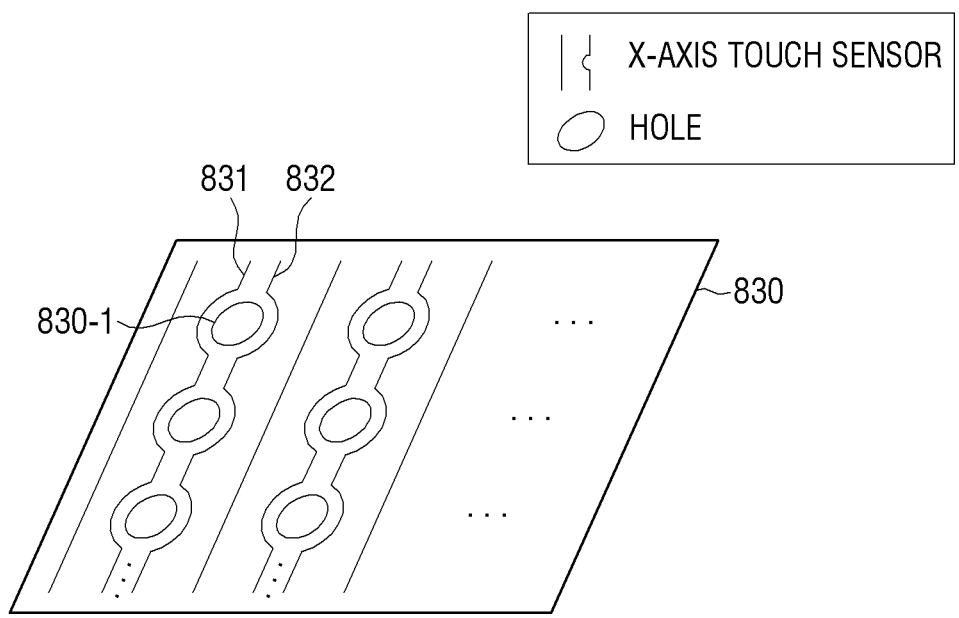
FIGS. 8A to 9 are views illustrating configurations of touch sensors included in touch sensor sheets according to one or more exemplary embodiments.
Figure 8B:
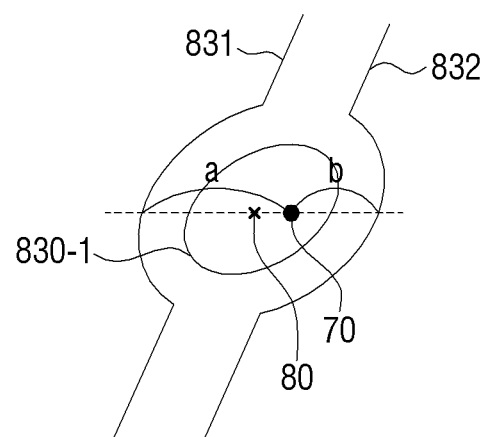

FIGS. 8A and 8B illustrate an example of another pattern of a touch sensor in a touch sensor sheet according to an exemplary embodiment. As illustrated in FIG. 8A, patterns of touch sensors 831 and 832 included in a touch sensor sheet 830 according to an exemplary embodiment may surround a hole 830-1.

For example, as illustrated in FIG. 8B, when a point on the touch display panel corresponding to a region of the hole 830-1 is touched by the user, a distance from a point 70 on the touch sensor sheet corresponding to the touched point to the touch sensor 831 is a, and a distance from the point 70 to the touch sensor 832 is b. If a is equal to b, voltages having the same magnitude may be induced in the touch sensors 831 and 832, and, since an x-axis coordinate of a center 80 of the hole 830-1 is previously known, the x-axis coordinate value of the center 80 of the hole 830-1 may be determined as an x-axis coordinate value of the touched point. If a is larger than b, a voltage induced in the touch sensor 832 is larger than a voltage induced in the touch sensor 831, and an x-coordinate of a user touch point may be estimated using a ratio of the induction voltages generated in the two touch sensors 831 and 832.

Even if a point on the touch display panel corresponding to the hole or a region around the hole is touched by the user, the touch sensor may sense the user touch, and the coordinates of the touched point may be estimated through the above-described method. However, this is merely an example, and a method of estimating a user touch point is not limited thereto.

The above-described method of estimating a touch point may be applied to the exemplary embodiments of FIGS. 6 and 7.

Figure 9:
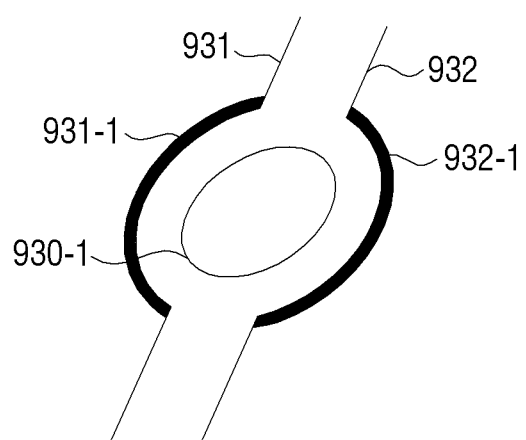

FIG. 9 illustrates a pattern of a touch sensor included in a touch display panel according to another exemplary embodiment. Generally, as a thickness of the touch sensor increases, the touch sensitivity thereof increases. Therefore, in order to increase the touch sensitivity in the region around the hole, as illustrated in FIG. 9, touch sensors 931 and 932 have patterns so that portions 931-1 and 931-2 of touch sensors 931 and 932 surrounding a hole 930-1 may have greater thicknesses than portions of the touch sensors 931 and 932 not surrounding the hole 930-1.

Various exemplary embodiments have described with the BLU board and the optical sheet being separately configured, but the configuration of the touch display panel is not limited thereto. In an exemplary embodiment, a touch display panel may include a backlight unit in which two or more of an optical sheet, a touch sensor sheet, and a BLU board including a plurality of light-emitting devices are combined into one component.

Further, the pattern of the touch sensor included in the touch sensor sheet is also not limited to the linear pattern in the region other than the hole or the pattern surrounding the hole as described above, and the pattern of the touch sensor may have various patterns such as a circular pattern or a zigzag pattern. Further, the touch sensor may have an angled pattern with respect to edges of the touch sensor sheet.

In the touch display panel according to an exemplary embodiment, the EMI type touch sensor sheet may be attached to a direct type LCD panel, but this is not limited thereto. The technical features of one or more exemplary embodiments having the structure, in which the touch sensor sheet is located on the light-emitting device and has a hole corresponding to the light-emitting device, may be applied to other types of display panels or other types of touch sensors.

Figure 10:
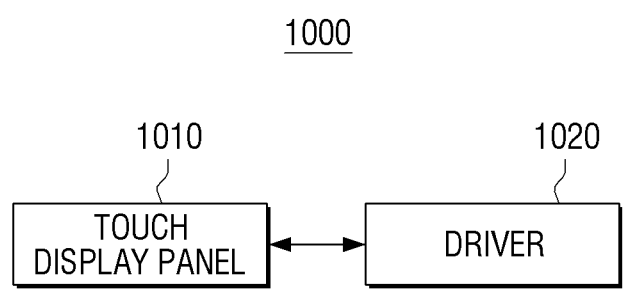
FIG. 10 is a block of a display apparatus according to an exemplary embodiment.

FIG. 10 is a block diagram illustrating a configuration of a display apparatus according to an exemplary embodiment. Referring to FIG. 10, a display apparatus 1000 includes a display panel 1010 and a driver 1020, i.e. a driving unit or a driver unit. The display apparatus 1000 may be implemented with a television (TV), a smart phone, a tablet personal computer (PC), an electronic photo frame, a laptop PC, a table-type display, a large format display (LFD), or the like.

The touch display panel 1010 may be the touch display panel according to the various exemplary embodiments described above with reference to FIGS. 4 to 9. The touch display panel 1010 may include a backlight unit including a plurality of light-emitting devices, and a touch sensor sheet located on the backlight unit and including at least one hole corresponding to at least one of the plurality of light-emitting devices and a touch sensor configured to sense a user touch on the touch display panel 1010. The backlight unit may be a direct type backlight unit, and the touch sensor unit may be white. The holes may be formed on the touch sensor sheet to have positions and sizes of the holes corresponding to positions and sizes of the plurality of light-emitting devices.

The touch display panel 1010 may further include an optical sheet configured to transfer light emitted from the backlight unit, and the touch sensor sheet may be located between the optical sheet and the backlight unit.

The touch sensor may have a predefined pattern in a region of the touch sensor sheet excluding the holes. The predefined pattern may be a pattern surrounding the holes. The touch sensor sheet may include at least one first touch sensor sheet having a touch sensor pattern of a first direction configured to sense an X-axis coordinate of a user touch and at least one second touch sensor sheet having a touch sensor pattern of a second direction crossing the first direction configured to sense a Y-axis coordinate of the user touch.

The driver 1020 drives the touch display panel 1010. Specifically, the driver 1020 may generate various signals for driving the touch display panel 1010 according to control of a controller, and provide the generated signals to the touch display panel 1010. Thus, the touch display panel 1010 may display an image, and sense the user touch. The driver 1020 may be configured to drive the touch display panel in a display apparatus.

According to the above-described exemplary embodiments, even in a display panel having a direct type backlight structure, an EMI type touch sensor may be applied without reduction in touch sensitivity and degradation in image quality, and a display apparatus having the touch display panel may be provided.

The foregoing exemplary embodiments and advantages are merely exemplary and are not to be construed as limiting. The exemplary embodiments can be readily applied to other types of devices. Also, the description of one or more exemplary embodiments is intended to be illustrative, and not to limit the scope of the claims and their equivalents, and many alternatives, modifications, and variations will be apparent to those skilled in the art.

What is claimed is:

1. A touch display panel comprising:
    a backlight unit including a plurality of light-emitting devices;
    a touch sensor sheet disposed directly on an upper surface of the backlight unit, comprising a plurality of holes and a touch sensor configured to sense a user touch on the touch display panel; and
    an LCD cell disposed on the touch sensor sheet.

2. The touch display panel as claimed in claim 1, further comprising an optical sheet configured to transfer light emitted from the plurality of light-emitting devices,
    wherein the touch sensor sheet is disposed between the optical sheet and the backlight unit.

3. The touch display panel as claimed in claim 1, wherein a position and size of the at least one hole corresponds to a position and size of the at least one of the plurality of light-emitting devices.

4. The touch display panel as claimed in claim 1, wherein the touch sensor has a predefined pattern in a region of the touch sensor sheet excluding the at least one hole.

5. The touch display panel as claimed in claim 4, wherein the touch sensor sheet comprises:
    at least one first touch sensor sheet having a touch sensor pattern of a first direction configured to sense an X-axis coordinate of the user touch; and
    at least one second touch sensor sheet having a touch sensor pattern of a second direction crossing the first direction configured to sense a Y-axis coordinate of the user touch.

6. The touch display panel as claimed in claim 4, wherein the predefined pattern comprises a pattern surrounding the at least one hole.

7. The touch display panel as claimed in claim 1, wherein the backlight unit is a direct type backlight unit.

8. The touch display panel as claimed in claim 1, wherein a color of the touch sensor sheet is white.

9. A display apparatus comprising:
    a touch display panel; and
    a driver configured to drive the touch display panel,
    wherein the touch display panel comprises:
    a backlight unit including a plurality of light-emitting devices;
    a touch sensor sheet disposed directly on an upper surface of the backlight unit, and comprising a plurality of holes and a touch sensor configured to sense a user touch on the touch display panel; and
    an LCD cell disposed on the touch sensor sheet.

10. The display apparatus as claimed in claim 9, wherein the touch display panel further comprises an optical sheet configured to transfer light emitted from the plurality of light-emitting devices, and
    the touch sensor sheet is disposed between the optical sheet and the backlight unit.

11. The display apparatus as claimed in claim 9, wherein a position and size of the at least one hole corresponds to a position and size of the at least one of the plurality of light-emitting devices.

12. The display apparatus as claimed in claim 9, wherein the touch sensor has a predefined pattern in a region of the touch sensor sheet excluding the at least one hole.

13. The display apparatus as claimed in claim 12, wherein the touch sensor sheet comprises:
    at least one first touch sensor sheet having a touch sensor pattern of a first direction configured to sense an X-axis coordinate of the user touch; and
    at least one second touch sensor sheet having a touch sensor pattern of a second direction crossing the first direction configured to sense a Y-axis coordinate of the user touch.

14. The display apparatus as claimed in claim 12 wherein the predefined pattern comprises a pattern surrounding the at least one hole.

15. The display apparatus as claimed in claim 9, wherein the backlight unit is a direct type backlight unit.

16. The display apparatus as claimed in claim 9, wherein a color of the touch sensor sheet is white.

17. A touch sensor sheet comprising:
    a first substrate having a plurality of first holes formed therein; and at least one electromagnetic induction (EMI) type touch sensor disposed on a region of the first substrate excluding the plurality of first holes.

18. The touch sensor sheet according to claim 17, wherein the at least one EMI type touch sensor comprises at least one respective elongated sensing coil.

19. The touch sensor sheet according to claim 18, wherein a portion of the at least one elongated sensing coil surrounding the at least one first hole has a greater thickness than a portion of the at least one elongated sensing coil not surrounding the at least one first hole.

20. The touch sensor sheet according to claim 17, further comprising:
- a second substrate having at least one second hole, a size and position of the at least one second hole corresponding to a size and position of the at least one first hole; and
- at least one second touch sensor disposed on a region of the second substrate excluding the at least one second hole,
- wherein a pattern of the at least on EMI type touch sensor formed on the first substrate differs from a pattern of the at least one second touch sensor formed on the second substrate.

* * * * *